United States Patent [19]

Novak et al.

[11] Patent Number: 5,458,232

[45] Date of Patent: Oct. 17, 1995

[54] ARTICLE LIFTING CONTAINER

[75] Inventors: Gregory J. Novak, Anoka, Minn.; Albert M. Evans, P.O. Box 1341, Fair Oaks, Calif. 95628

[73] Assignee: Albert Michael Evans, Fair Oaks, Calif.

[21] Appl. No.: 138,455

[22] Filed: Oct. 15, 1993

[51] Int. Cl.⁶ .................................................. B65H 1/00
[52] U.S. Cl. .................. 206/45.16; 206/556; 206/817; 221/279; 221/276; 221/59
[58] Field of Search .................. 206/45.16, 536, 206/817; 221/279, 58, 59, 271, 276

[56] References Cited

U.S. PATENT DOCUMENTS

| | | | |
|---|---|---|---|
| 855,653 | 6/1907 | Muller | 221/59 |
| 1,065,293 | 6/1913 | Clarke | 221/59 |
| 2,287,146 | 6/1942 | Stern | 221/276 |
| 2,426,995 | 9/1947 | Gibbs | 221/279 |
| 3,567,293 | 3/1971 | Salcman | 221/279 |
| 3,861,563 | 1/1975 | Lisbin et al. | 221/279 |
| 4,199,076 | 4/1980 | Brown | 221/59 |
| 4,243,153 | 1/1981 | Mitchell | 221/279 |
| 4,854,479 | 8/1989 | Callahan et al. | 221/279 |
| 5,048,720 | 9/1991 | Hoke | 221/276 |
| 5,253,757 | 10/1993 | Locker | 206/556 |

FOREIGN PATENT DOCUMENTS

| | | | |
|---|---|---|---|
| 749798 | 1/1967 | Canada | 221/279 |
| 219157 | 2/1985 | Germany | 221/279 |
| 160603 | 6/1933 | Switzerland | 206/45.16 |

*Primary Examiner*—Joseph Man-Fu Moy
*Attorney, Agent, or Firm*—Bernhard Kreten

[57] ABSTRACT

An article lifting container (10) is provided which includes an outer housing (50) with a lift (100) within an interior thereof supporting a shelf (150). The lift (100) automatically adjusts a position of the shelf (150) vertically depending on a weight of articles (30) placed upon the shelf (150). The lift (100) includes a base (110) supported by the housing (50) and which in turn supports a spring (130) between the base (110) and the shelf (150). An alignment post (120) aligns the shelf (150) to motion only vertically away from and toward the base (110). A sleeve (140) is fixedly attached to the shelf (150) and surrounds the alignment post (120). The sleeve (140) prevents the shelf (150) from pivoting due to uneven loads of articles upon the shelf (150).

15 Claims, 5 Drawing Sheets

ARTICLE LIFTING CONTAINER

FIELD OF THE INVENTION

The following invention relates to containers for supporting and displaying merchandise or other articles. More particularly, this invention relates to containers which include a shelf supporting merchandise thereon in an automatically adjustable fashion which allows the shelf to be positioned at different locations with respect to a top of the container depending on a weight of the articles placed upon the shelf.

BACKGROUND OF THE INVENTION

Bin style containers are known in the art which are utilized for storing and supporting various articles. Many of these containers are fully enclosed except for an upper end. When articles are to be placed into or removed from these containers, a user must reach into the container to place an article into the container or remove an article out of the container. While these containers are well known in the art they suffer from numerous drawbacks. Many of these containers are only convenient when full. As they empty, a user must bend down into the container to access articles within the container. Furthermore, articles within the container become less visible from a distance as the number of articles within the container is reduced, thus diminishing the effectiveness of the display.

Some containers in the prior art exhibit a false floor which is closer to the upper end than is a lower end of the container. While this false floor eliminates the need to bend down into the container and keeps the articles in view of persons proximate to the containers, these shelves significantly reduce a capacity of the container. In addition, containers of this type are often used for storing chilled beverages in an ice bath in a manner similar to that of an "ice chest". Such containers inevitably end up with standing water at a lower portion of the container providing a breeding ground for bacteria.

Accordingly, a need exists for a container which can hold a large number of articles therein, and yet keep the articles near an upper opening of the container. For containers which include ice therein, a need exists for a container which can draw the melted water away from the articles contained within the ice bath.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | U.S. Pat. No. | ISSUE DATE |
| --- | --- | --- |
| Long | 1,554,589 | September 22, 1925 |
| Kelley | 3,308,840 | March 14, 1967 |
| Takeuchi | 4,193,487 | March 18, 1980 |
| Pollacco | 4,403,692 | September 13, 1983 |
| Perez | 4,702,290 | October 27, 1987 |
| Webb | 5,033,637 | July 23, 1991 |

SUMMARY OF THE INVENTION

The article lifting container of this invention includes a housing with a lift supporting a shelf therein. The housing includes a floor with the sidewalls extending upward therefrom. An upper edge of the sidewalls defines an upper opening of the container. The housing is thus essentially a hollow volume completely enclosed except for the upper opening through which an interior of the container can be accessed.

A shelf is oriented substantially horizontally within the housing and below the upper opening in a manner which forms a false floor for the container. The shelf extends horizontally across an interior of the container and defines a article supporting area above the floor.

A lift is provided below the shelf and above a floor of the housing. The lift includes a spring to elevate the shelf vertically upward or downward in a manner corresponding to a weight of articles placed upon the shelf. When more articles are added to the shelf, the shelf moves down. When articles are removed from the shelf, the shelf moves up. The lift includes means to align the shelf within the container and means to prevent pivoting of the shelf within the container.

The lift has a base which is supported by the housing and has a lower end of the spring attached thereto. An upper end of the spring is attached to the shelf. The spring is selected to have a spring constant which corresponds to a weight of individual articles to be placed upon the shelf. The spring constant is such that when only a few articles are placed upon the shelf, the shelf extends downward vertically only slightly, leaving the articles in view adjacent the upper opening of the container. As more articles are placed upon the shelf, and upon articles which are upon the shelf, the shelf is translated further downward. However, articles at a top of the stack of articles remain adjacent the upper opening of the container. In this way, the container can be "loaded" and "emptied" with an upper layer of articles always remaining adjacent the upper opening of the container.

The shelf includes holes therein which can allow water to pass therethrough. Thus, when articles such as chilled beverages within cans are placed upon the shelf along with an ice bath, water from the melting ice passes down through holes in the shelf while the ice and chilled beverages remain adjacent the upper opening of the container.

The container includes wheels on a lower surface thereof for translation of the container along an appropriate surface. A drain is provided near a floor of the container for removal of excess water. An insulation layer is provided within sidewalls of the housing which reduces a rate of heat transfer into the container.

OBJECTS OF THE INVENTION

Accordingly, it is a primary object of the present invention to provide a container having an opening near an upper end thereof and which maintains articles stored therein adjacent the opening regardless of the number of articles within the container.

Another object of the present invention is to provide a container which can support articles in a manner which allows them to be easily seen and easily removed and placed therein.

Another object of the present invention is to provide a container which can support chilled beverages in an ice bath near an opening of the containers regardless of the amount of chilled beverages within the container, while simultaneously removing melting water from the ice bath.

Another object of the present invention is to provide a container which is formed from readily available, light weight, easily cleaned materials.

Another further object of the present invention is to provide a container with a shelf therein which is adjustable vertically toward and away from an upper opening of the container.

Viewed from a first vantage point, it is an object of the present invention to provide a container for supporting and adjustably locating articles therewithin, comprised of a container including an opening on an upper end thereof, a shelf within said container and below said opening, said shelf supporting a plurality of articles thereon, and means for automatically adjusting an elevation of said shelf when an weight of the articles upon said shelf.

Viewed from a second vantage point, it is an object of the present invention to provide a method for containing articles for display within a container which is open only on an upper end thereof such that some of the articles remain adjacent the upper end regardless of how full the container is, the method including providing a lift within the container, the lift including a base supported by the container and a shelf located above the base with a spring means interposed between the base and the shelf, and selecting a spring means which compresses under article weight an amount sufficient to keep articles placed upon the shelf adjacent the upper end.

Viewed from a third vantage point, it is an object of the present invention to provide a lift for supporting articles within a container, the container having an opening at an upper end thereof for locating and removing articles therefrom, the lift keeping some of the articles adjacent the opening continuously, the lift comprised of a shelf having a top surface capable of supporting articles thereon, a base supported by the container, and a means for translating said shelf vertically with respect to said base, said translation means lowering said shelf towards said base when a number of the articles upon said shelf increases and raising said shelf away from said base when a number of the articles upon said shelf decreases.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to an article lifting container according to the present invention. The container 10 (FIG. 1) includes a housing 50 with a lift 100 therein supporting a shelf 150 thereabove. The shelf 150 supports articles 30 (FIG. 6A and 6B) adjacent an upper opening 52 of the housing 50.

Figure 1:
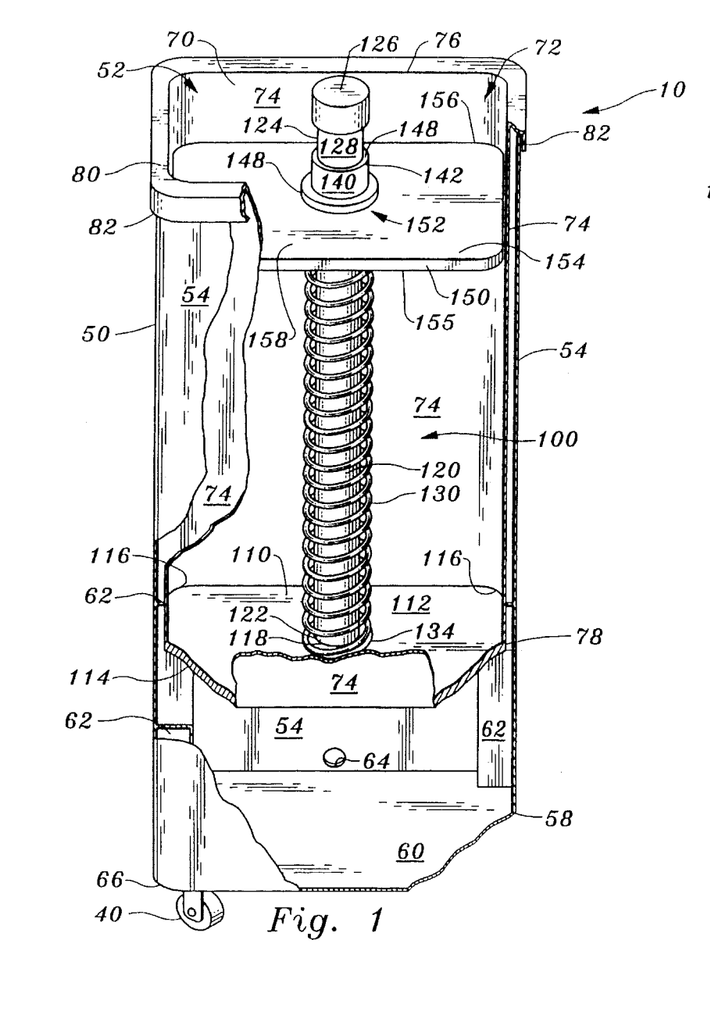
FIG. 1 is a perspective view of the container of this invention with portions of the container cut away to reveal interior details thereof.
Figure 2:
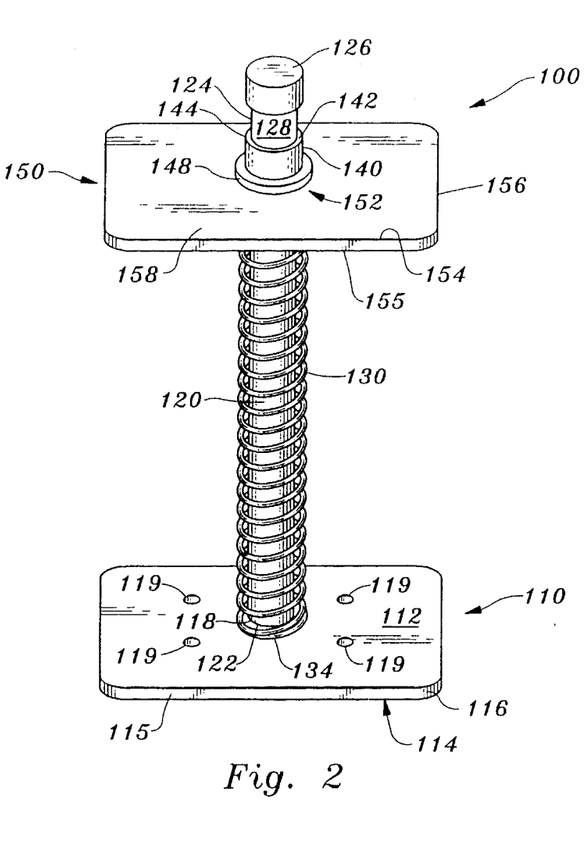
FIG. 2 is a perspective view of a portion of that which is shown in FIG. 1.
Figure 6A:
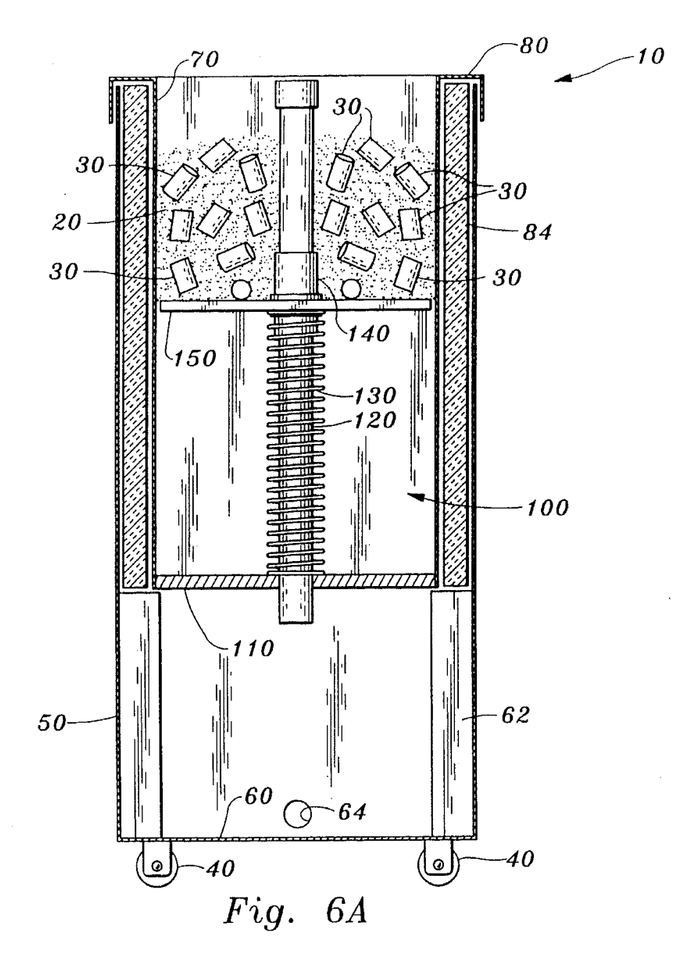
FIG. 6A is a front sectional view of the device of this invention with articles supported upon a shelf therein.
Figure 6B:
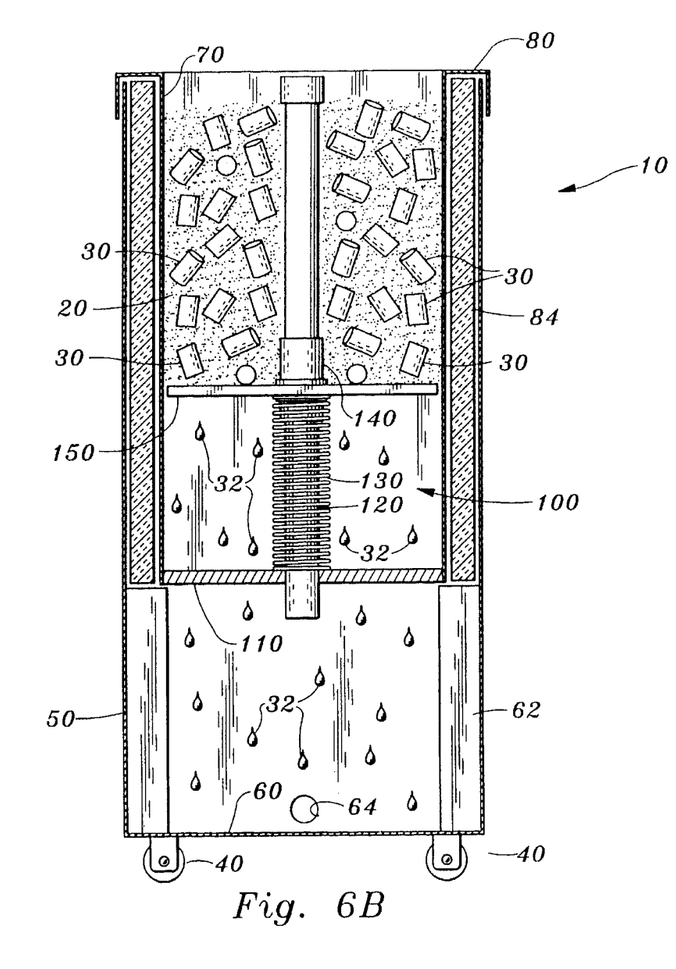
FIG. 6B is a front sectional view of the device of this invention with still more articles supported upon a shelf thereof.

In essence, and with reference to FIG. 1, the container 10 is defined on an exterior by the housing 50. The housing 50 is a hollow rigid construct with an upper opening 52 providing access to an interior of the housing 50. The housing 50 contains the lift 100 therein. The lift 100 includes a base 110 on a lower portion thereof and a shelf 150 on an upper portion thereof. A spring 130 is interposed between the base 110 and the shelf 150. When articles 30 are placed upon the shelf 150, the shelf 150 is depressed downward toward the base 110, allowing the container 10 to be filled with a multiplicity of articles 30 (FIGS. 6A and 6B). As articles 30 are removed from the container 10, the lift 100 elevates the shelf 150 toward the upper opening 52 of the housing 50, maintaining the articles 30 near the upper opening 52 of the housing 50. Thus, the articles 30 are always maintained near the upper opening 52 of the housing 50 regardless of the amount of articles 30 within the container 10.

More specifically, and referring in detail to FIGS. 1 and 3 through 5B, details of the housing 50 are shown. The housing 50 is preferably a hollow orthorhombic construct which forms an enclosed volume except for an upper opening 52 on an uppermost surface of the housing 50. Sidewalls 54 extend vertically downward from upper edges 56 of the sidewalls 54 which surround the upper opening 52 and define the upper opening 52 of the housing 50. The sidewalls 54 extend vertically downward to a lower edge 58 which transitions into a substantially horizontal floor 60. The floor 60 is located at an end of the housing 50 opposite the upper opening 52.

While the housing 50 is preferably square or rectangular in cross section, the housing 50 can also easily be made in a cylindrical fashion with a circular or oval cross section as well as many other geometric shapes. When articles 30 (FIGS. 6A and 6B) are to be maintained at a temperature above or below conditions outside the housing 50, insulation 84 (FIG. 4) can be located within or adjacent the sidewalls 54 of the housing 50. The insulation 84 is preferably water repellent to avoid the deleterious effects of prolonged contact with water. Additionally, a lid 170 (FIG. 7) can be provided which is removably locatable over the upper opening 52.

The floor 60 of the housing 50 includes lift supports 62 in each of the corners 64 of the interior of the housing 50. While the lift supports 62 are shown extending up from the floor 60, the lift supports 62 can also be configured as a cantilever extending horizontally away from the sidewalls 54 to form a ledge which can act as a support for the lift 100. The lift supports 62 elevate the lift 100 above the floor 60 of the housing 50 to provide a space where water 32 can collect if ice 20 is to be supported by the lift 100 (FIGS. 6A and 6B).

A drain 64 is provided in the housing 50 adjacent to the floor 60 which can evacuate the water 32 (FIG. 6B) which melts from the ice 20. While the lift supports 62 provide an elevation for the lift 100 significantly elevated above the floor 60 of the housing 50, if continuous drainage is utilized, the lift supports 62 can be significantly reduced in height while still maintaining the lift 100 above the floor 60 and above any water 32 collecting upon the floor 60.

Wheels 40 are provided underneath the floor 60 of the housing 50 to allow the container 10 to be moved along a hard substantially horizontal surface.

Preferably, a liner 70 is provided within the housing 50 which provides additional support for the lift 100 and isolates articles 30 (FIGS. 6A and 6B) from coming into contact with the sidewalls 54 of the housing 50. The liner 70 is preferably removable for cleaning and replacement when damaged without requiring replacement of the entire housing 50.

The liner 70 includes an upper opening 72 at an upper end thereof with sidewalls 74 configured to be adjacent the sidewalls 54 of the housing 50 yet inboard from the sidewalls 54. The sidewalls 74 of the liner 70 completely surround the lift 100 and extend from an upper edge 76 adjacent the upper opening 72 and defining the upper opening 72 and down along the sidewalls 74 to a lower edge 78. The upper edge 76 supports a horizontal lip 80 which extends over the upper edge 56 of the housing 50 and then extends downward with an overhang 82 on an outside of the upper edge 56 of the housing 50. The lip 80 and overhang 82 allow the liner 70 to remain rigidly in place supported by the sidewalls 54 of the housing 50. While the liner 70 is shown as a substantially orthorhombic hollow construct, the liner 70 can have any geometric shape which allows it to fit within the geometric shape of the housing 50. Thus, if the housing 50 is configured in a cylindrical fashion, the liner 70 would preferably also exhibit a cylindrical construction with a cross sectional diameter slightly less than a cross sectional diameter of the housing 50.

Referring now to FIGS. 1 through 5B, details of the lift 100 are shown in detail. The lift 100 includes a base 110 which is a substantially horizontal planar rigid construct which conforms to a cross section of the lower edge 78 of the liner 70. The base 110 includes a horizontal top surface 112 and a horizontal bottom surface 114. The base 110 has its perimeter defined by an edge 115 arranged between corners 116, providing the base 110 with a substantially rectangular planar appearance. The edges 115 of the base 110 are preferably connected to the lower edge 78 of the liner 70 such that when the liner 70 is moved out of the container 50, the base 110 and associated lift 100 are also removed from the container 50.

The base 110 includes a central hole 118 which supports portions of the lift 100, described hereinbelow, and a plurality of drain holes 119 which allow fluids to pass therethrough without collecting thereon. While the base 110 is preferably a substantially solid planar construct, the base 110 could also exhibit a truss-like configuration particularly designed to support a lower end of the lift 100 but without occluding an interior of the container 50.

The central hole 118 supports an alignment post 120 therewithin. The alignment post 120 includes a lower end 122 rigidly supported within the central hole 118 and an upper end 124 distant from the lower end 122. Preferably the alignment post is a elongate cylindrical construct formed from a rigid material. However, other elongate rigid configurations could be utilized. The alignment post 120 extends vertically upward from the central hole 118 of the base 110. The upper end 124 has a cap 126 placed thereon and exhibits a cylindrical surface 128 along a length of the alignment post 120.

A spring 130 is located with a lower end 134 connected to the top surface 112 of the base 110 and preferably surrounding the alignment post 120. Preferably, the spring 130 is of a helical coil compression spring variety. An upper end 132 of the spring 130 is preferably attached to the shelf 150. The spring 130 is carefully selected to have a spring constant which gives the lift 100 the desired characteristics. Specifically, a weight of individual articles and an average number of articles which can fit as one layer on the shelf 150 are utilized to calculate a desired amount of spring 130 travel, and hence shelf 150 travel upon the addition or removal of articles. The shelf 150 is thus in a state of equilibrium with an uppermost layer of articles adjacent the upper opening 52. When articles are removed or added, a new equilibrium position for the shelf 150 is obtained. Each equilibrium position provides articles adjacent the upper opening 52.

The shelf 150 is preferably a rigid planar construct having a horizontal planar top surface 154 spaced from a horizontal planar bottom surface 155. The shelf 150 preferably has edges 166 which are located adjacent the sidewalls 74 of the liner 70. The shelf 150 includes a central bore 152 passing vertically therethrough having a cross sectional area greater than a cross sectional area of the alignment post 120. The alignment post 120 is configured long enough to pass through the central bore 152 even when the spring 130 is extended a maximum distance above the base 110.

The upper end 132 of the spring 130 is fixedly attached to the bottom surface 154 of the shelf 150. Thus, when articles 30 are placed adjacent the top surface 154 of the shelf 150 (FIGS. 6A and 6B) a force is exerted downward upon the shelf 150 causing the spring 130 to be compressed and the shelf 150 to travel downward. The alignment post 120 keeps the spring 130 aligned vertically between the shelf 150 and the base 110. The alignment post 120 also keeps the shelf 150 centered within the container 50.

The central bore 152 of the shelf 150 preferably has a hollow cylindrical sleeve 140 fixedly attached therein and oriented with a long axis substantially vertical and colinear with a long axis of the alignment post 120. The sleeve 140 has a cylindrical inner surface 142 slightly greater than the cylindrical surface 128 of the alignment post 120. The sleeve 140 includes an upper end 144 located above the shelf 150 and a lower end 146 located below the shelf 150. Two L-rings, 148, one above the shelf 150 and one below the shelf 150, fixedly attach and support the sleeve 150 within the central bore 152 of the shelf 150.

The sleeve 140 is dimensioned with only a small tolerance between the inner surface 142 and the cylindrical surface 128 of the alignment post 120. Thus, the sleeve 140 prevents the shelf 150 from pivoting substantially with respect to the alignment post 120. The sleeve 140 thus maintains the shelf 150 in a substantially horizontal orientation to securely support articles 30 thereon. If the alignment post 120 is configured to have a non-cylindrical construction and a non circular cross section, the sleeve 140 can be appropriately modified to mirror in cross sectional configuration the cross sectional configuration of the alignment post 120.

The cap 126 of the upper end 124 of the alignment post 120 keeps the sleeve 140 and hence the shelf 150 within the housing 50 of the container 10. While the alignment post and sleeve can be made from a variety of different materials, it has been found that configuring the sleeve and alignment post from polyvinyl chloride tubing provides a durable low friction construction which is easy to construct and maintain. Other materials can also easily be utilized.

Figure 7:
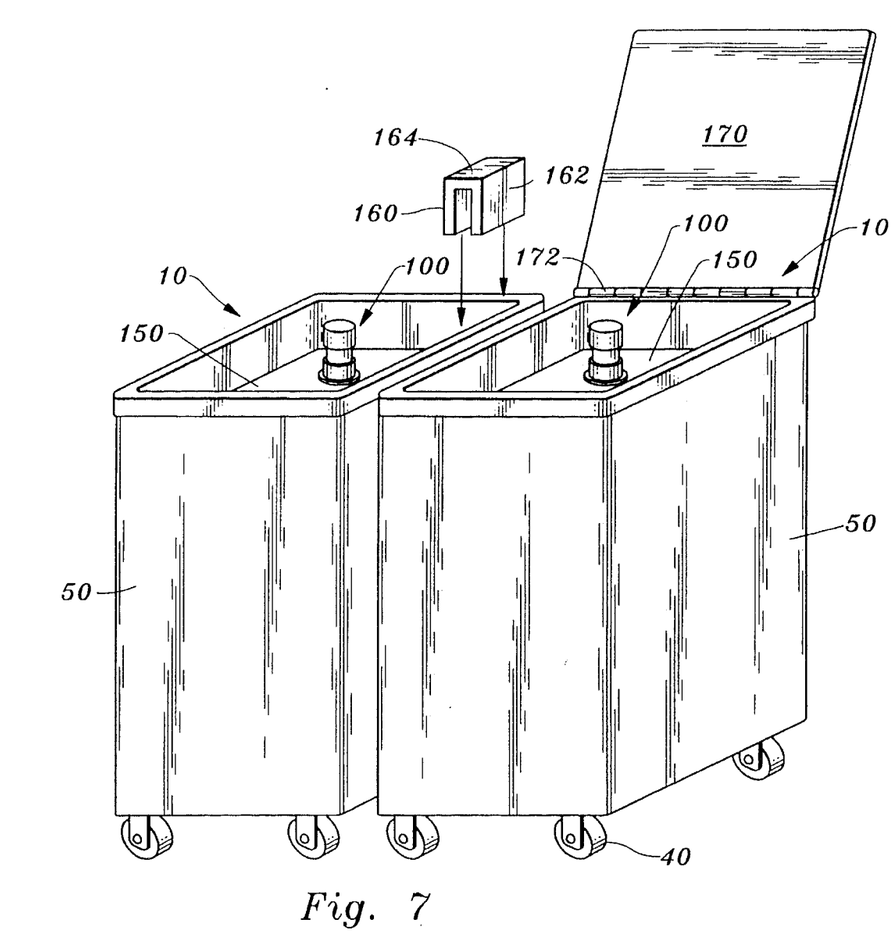
FIG. 7 is a perspective view of an alternative embodiment of that which is shown in FIG. 3 with multiple containers connected together.

Referring now to FIG. 7, details of a coupler 160 for joining two adjacent containers 10 is shown and described. The coupler 160 is essentially a rigid construct having a planar top 164 with two downwardly depending legs 162. The legs 162 are spaced apart a distance similar to two times the length of the lip 80 of the liner 70. Thus, when two containers 10 are placed adjacent each other, the coupler 160 can be placed over the lips 80 of the two adjacent containers 10 with one of the legs 162 depending down into one of the containers 10 and the other leg 162 depending down into the other container 10. In this way, multiple containers 10 can be arrayed to form a display case. For instance, in many grocery stores, large open ended freezers are provided. A plurality of containers 10 connected together with the coupler 160 could replace such an open ended freezer and could provide not only a flexibility of size but also the advantages of the lift 100 within the containers 10.

FIG. 7 also reveals an alternative embodiment of the containers where no liner is utilized. A lid 170 is shown which is pivotably attached to the container 10 through a hinge 172. Preferably, this lid 170 is clear for viewing of items contained therein.

Figure 3:
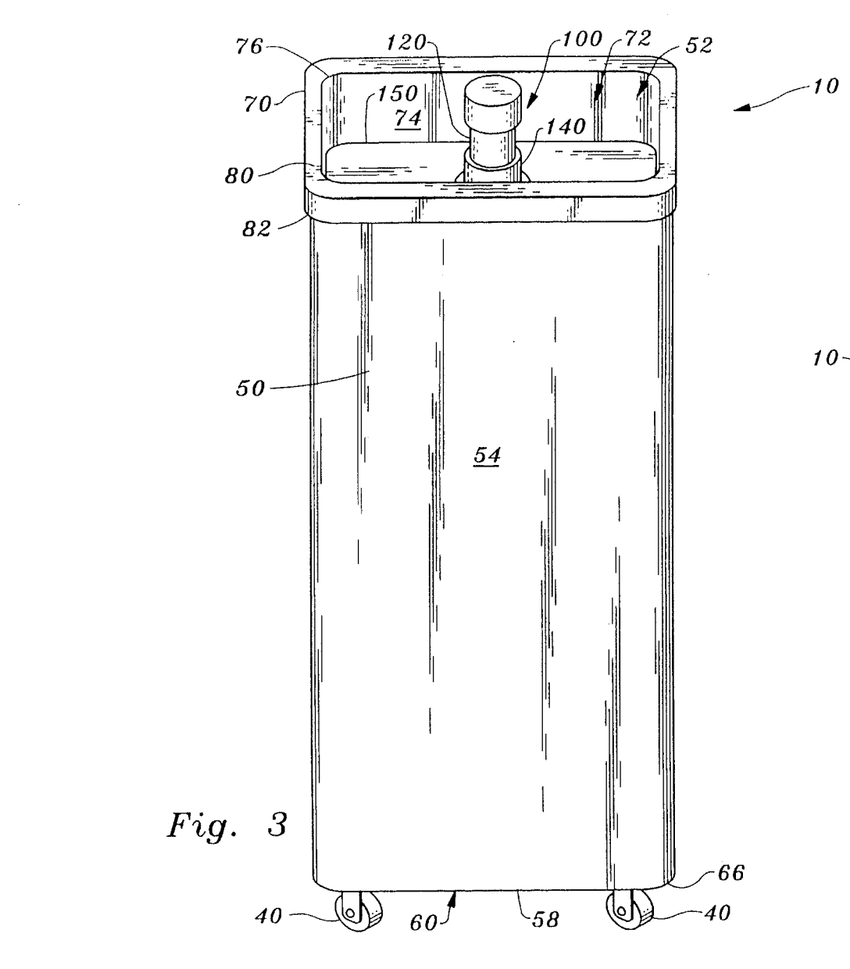
FIG. 3 is a perspective view of that which is shown in FIG. 1 without any details removed.
Figure 4:
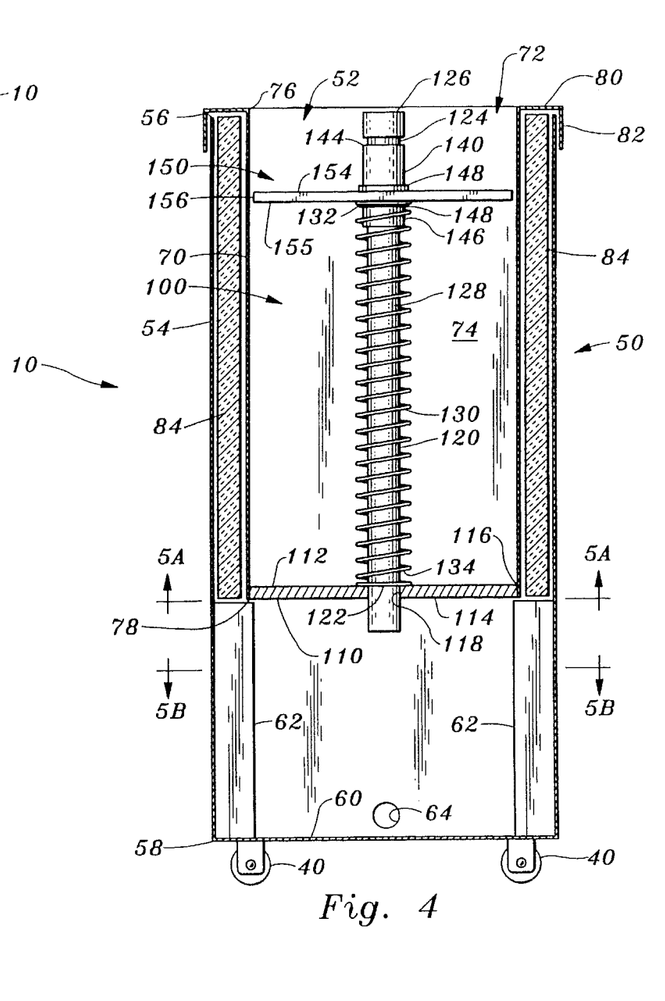
FIG. 4 is a front sectional view of that which is shown in FIG. 3.
Figure 5A:
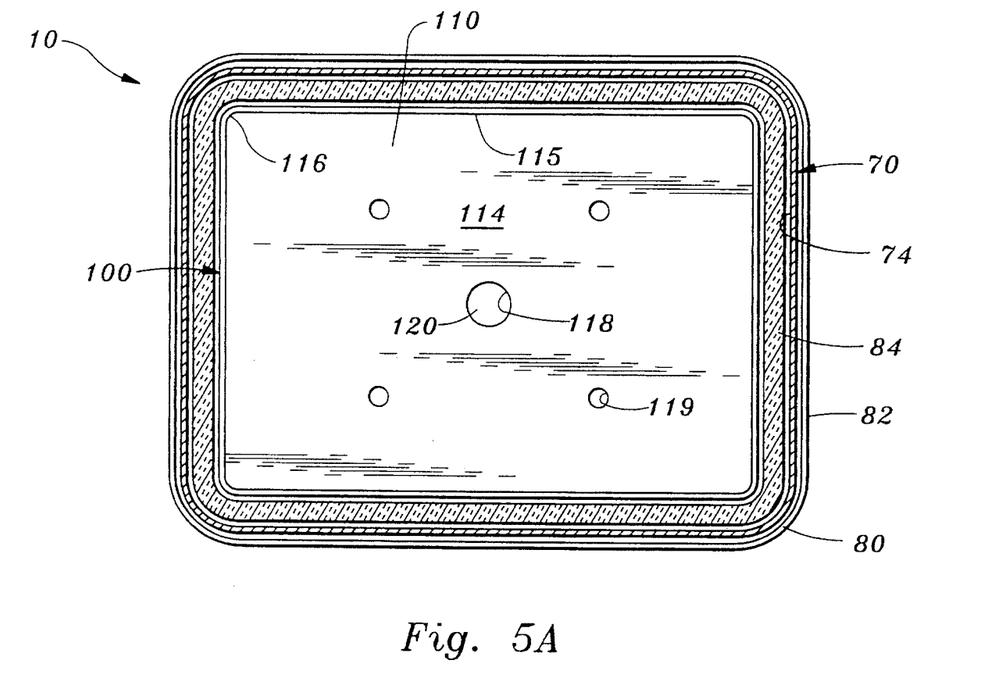
FIG. 5A is a sectional view taken along line 5A—5A of FIG. 4.
Figure 5B:
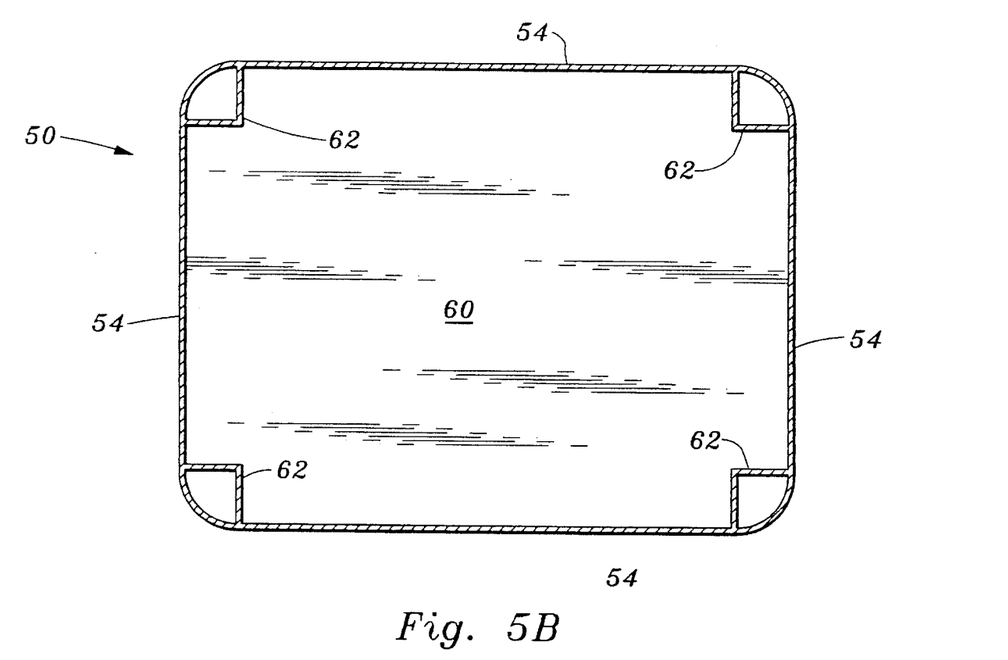
FIG. 5B is a sectional view taken along line 5B—5B of FIG. 4.

Referring now to FIG. 6A and 6B, details of the use and operation of the articles lifting container 10 are shown in detail. Initially, the container 10 is configured as shown in FIG. 3 with an empty housing 50 surrounding the lift 100 and shelf 150 with nothing placed upon the shelf 150. When articles 30 are to be stored and displayed within the container 10, the articles 30 are merely placed upon the top surface 154 of the shelf 150.

As shown in FIGS. 6A and 6B, articles 30 such as chilled beverages within cans can be placed upon the shelf 150 and supported therein for display. Additionally, ice 20 can be poured over the articles 30 in order to attain a desired temperature. As additional ice and articles 30 are placed on the shelf 150, the shelf 150 travels downward by compressing the spring 130 between the shelf 150 and the base 110. The alignment post 120 keeps the shelf 150 along a vertical path. The sleeve 140 prevents the shelf 150 from pivoting under unbalanced loads. An upper level of articles 30 and ice 20 thus always remains adjacent the upper opening 52 of the housing 50 of the container 10.

Users can always see the articles 30 within the container 10 without standing directly over the container 10 and can reach the articles 30 without having to reach down into the container 10 significantly beyond the upper opening 52 of the housing 50. As the ice 20 melts into water 32, holes 158 within the shelf 150 allow the water 32 to drip down to the floor 60 of the housing 50 and exit through the drain 64. The articles 30 are thus prevented from being emersed within water and any standing water is isolated from the articles 30, thus eliminating a potential health hazard of bacteria growing within a standing water pool.

As articles 30 are removed from the container 10, the lift 100 causes the shelf 150 to be elevated maintaining the articles 30 adjacent the upper opening 52. When viewing the container as shown in FIG. 6A and then in FIG. 6B, the effect of loading the container 10 with articles 30 is shown. When viewing FIGS. 6B and then FIG. 6A, the effect of unloading the container 10 is represented. While chilled beverage articles 30 and ice 20 are particularly shown, other articles may also be placed upon the shelf 150.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A container for supporting and adjustably locating articles in an interior thereof, comprising in combination:

a container including an opening on an upper end thereof, a shelf within said container and below said opening, said shelf supporting a plurality of articles thereon, means for automatically adjusting an elevation of said shelf when a weight of the articles upon said shelf changes containing at least one alignment post, and means for preventing pivoting of said shelf out of a horizontal orientation comprising a sleeve fixedly attached to said shelf, said sleeve having an interior contour complemental to an exterior contour of said post and surrounding said post, said sleeve extending along a length of post sufficient to preclude appreciable motion between said sleeve and said post, whereby when pivoting forces are exerted upon said shelf, said sleeve prevents said shelf from pivoting.

2. The device of claim 1 further including a means to align said shelf for translation only in a substantially vertical direction.

3. The device of claim 2 wherein said automatic adjusting means is a plurality of compressible springs, each said spring having a first end held stationery with respect to said container and a second end held stationery with respect to said shelf, whereby when weight of the articles upon said shelf changes a force compressing said plurality of springs changes, causing said shelf to move.

4. The device of claim 3 wherein said alignment means is a post interposed along a central axis of at least one of said plurality of springs, said post held stationery with respect to said container on a first end and passing through a bore in said shelf without attachment to said shelf.

5. The device of claim 1 wherein said shelf includes a plurality of holes passing from a top surface thereof down through a bottom surface thereof, said holes smaller than said articles.

6. The device of claim 5 wherein said container includes insulation therein inhibiting heat transfer through said container.

7. The device of claim 3 wherein said spring is connected through said lower end to a base, said base supported by said container at a location above a floor of said container in a manner which allows said base to be displaced vertically upward and out of said container, but is prevented from moving vertically downward toward said floor, whereby said lower end of said spring is supported through said base to said container.

8. The device of claim 7 wherein said container includes wheels on a lower surface thereof, whereby the container can be rolled upon a surface, and wherein said container includes a drain proximate to said floor, said drain allowing fluid to migrate out of said container.

9. A method for containing articles for display within a container which is open only on an upper end thereof such that some of the articles remain adjacent the upper end regardless of how full the container is, the method including:

providing a lift within the container, the lift including a base supported by the container and a shelf located above the base with a spring means including at least one alignment post, interposed between the base and the shelf, providing the shelf with an anti-pivoting means, the anti-pivoting means preventing pivoting of the shelf with respect to the container when uneven loads are placed upon the shelf, the anti-pivoting means comprising a sleeve fixedly attached to said shelf, said sleeve having an interior contour complemental to an exterior contour of said post and surrounding said post, said sleeve extending along a length of post sufficient to preclude appreciable motion between said sleeve and said post, whereby when pivoting forces are exerted upon said shelf, said sleeve prevents said shelf from pivoting, selecting a spring means which compresses under article weight an amount sufficient to keep articles placed upon the shelf adjacent the upper end.

10. The method of claim 9 wherein said selecting step includes the steps of identifying a weight of each article to be located within the container, identifying a volume of each article to be located within the container, and determining an appropriate spring constant for the spring means to exhibit to maintain an upper level of articles stacked upon each other and upon said shelf which is adjacent the upper end of the container.

11. The method of claim 10 including the further step of aligning the spring means to maintain the shelf along a vertical traveling pathway without horizontal displacement of the shelf.

12. A lift for supporting articles within a container, the container having an opening at an upper end thereof for locating and removing articles therefrom, the lift keeping some of the articles adjacent the opening continuously, the lift comprising, in combination:

a shelf having a top surface capable of supporting articles thereon, a base supported by the container, a means for translating said shelf vertically with respect to said base, said translation means lowering said shelf towards said base when a number of the articles upon said shelf increases and raising said shelf away from said base when a number of the articles upon said shelf decreases, an alignment means including a post fixedly attached on a lower end to said base and passing through a central bore in said shelf, said alignment post having an exterior surface similarly configured to a surface of the central bore of the shelf, whereby when forces are exerted upon the shelf in a horizontal manner, the central bore impacts the alignment post, maintaining the shelf in a nonhorizontally translating configuration, and a means to prevent pivoting of said shelf out of a horizontal orientation, wherein said anti-pivoting means is a sleeve oriented vertically along said central bore and having an inner surface complemental to an exterior surface of said alignment post, said sleeve having a vertical length sufficient to prevent substantial pivoting of said sleeve, said sleeve fixedly attached to said shelf, whereby said shelf is prevented from pivoting out of a horizontal orientation.

13. The device of claim 12 wherein said translating means is a spring with a lower end fixedly attached to said base and an upper end fixedly attached to said shelf, said spring exhibiting a spring constant sufficient to maintain an uppermost layer of articles supported upon said shelf adjacent the opening.

14. The device of claim 13 further including a means to align said shelf along a vertical pathway and restraining said shelf from horizontal translation with respect to the container.

15. The device of claim 12 wherein said shelf includes holes passing therethrough and said base includes holes passing therethrough, such that water and other fluids can pass through said shelf and through said base and drain away from articles supported upon said shelf, and wherein said base is supported by said container through a liner, said liner having vertically extending side walls extending up from edges of said base, said side walls extending up to an upper edge which supports a lip thereon, said lip having an overhang extending downwardly therefrom, said lip and overhang configured to overlie an upper edge of a housing of the container, whereby said base of said lift is supported by said container.

* * * * *